Figure 1:
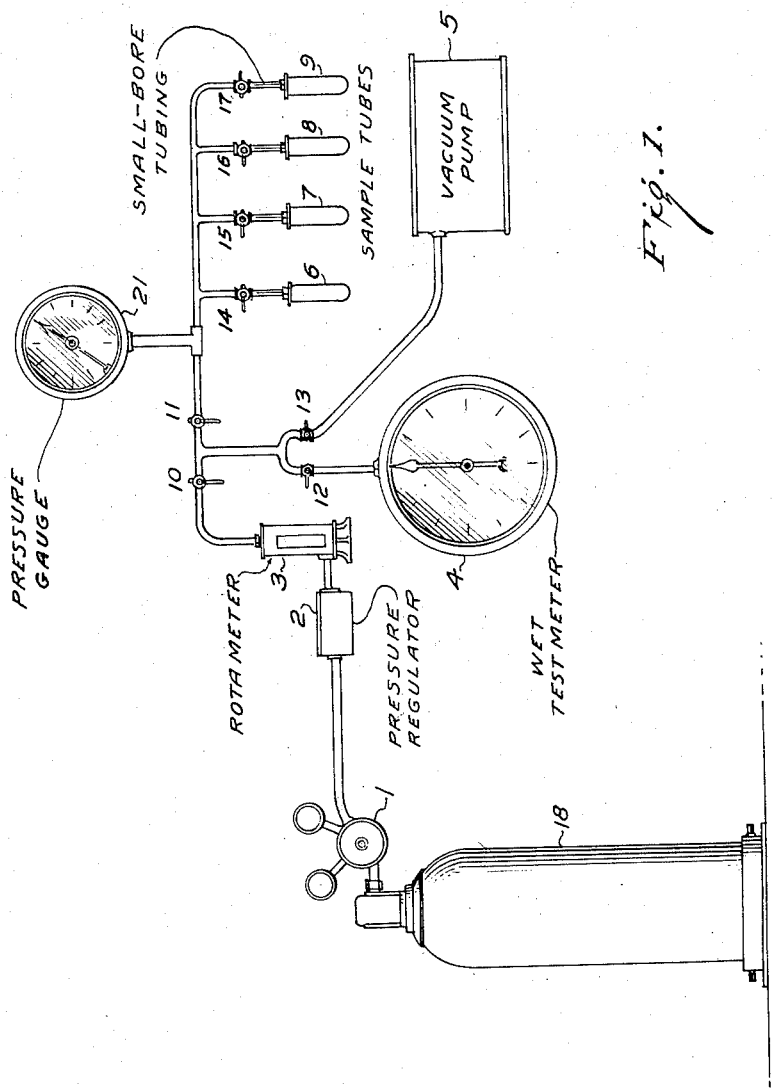

April 16, 1957 W. B. INNES 2,788,657
METHOD FOR SURFACE AREA AND PORE VOLUME
MEASUREMENT BY DESORPTION
Filed Nov. 20, 1953 2 Sheets-Sheet 2

INVENTOR
WILLIAM B. INNES,
BY Robert W. Kell
ATTORNEY

United States Patent Office 2,788,657
Patented Apr. 16, 1957

2,788,657

METHOD FOR SURFACE AREA AND PORE VOLUME MEASUREMENT BY DESORPTION

William B. Innes, Stamford, Conn., assignor to American Cyanamid Company, New York, N. Y., a corporation of Maine Application November 20, 1953, Serial No. 393,343

4 Claims. (Cl. 73—38)

This invention relates to a new and improved method for the measurement of the surface area and pore volume of catalysts, pigments, soil and other materials of such physical dimensions that a knowledge of these properties becomes important.

In carrying out catalytic chemical reactions and processes, it is important to know the surface area and pore volume of the catalytic materials employed, as these factors are related to the rate of reaction. It is well recognized that the catalytic reaction takes place on the surface of the catalytic material. Pore volume or structure is important, since it governs the diffusion of reactants and products to and from the surface of the catalytic material as well as exerting considerable influence upon the stability or life of the material.

There are wide differences of structure among catalysts. Most of the cracking catalysts have practically their entire area and pore volume contributed by the very small pores, in the 15 to 100 A. range, whereas other materials have pores larger than 200 A. in diameter. Consequently, it is of utmost importance in practical commercial catalytic work that accurate and practical methods of determining these characteristics be employed. Such measurements are exceedingly valuable in guiding catalyst preparation, treatment and use.

An object of this invention is to provide a rapid method for measuring the desorption of gases, particularly of nitrogen at liquid nitrogen temperature, whereby the determination of surface area and pore volume is greatly simplified. The use of nitrogen as an adsorbate at liquid nitrogen temperature has been generally accepted as a standard method for determining surface area because of the close checks that could be obtained by such measurements where the area was known geometrically.

The present invention provides a simple, practical, economical method for rapid, precise measurement of surface area and pore volume of all solids having a surface area in excess of 0.5 square meter per gram, and is particularly well adapted to catalytic materials and pigments. The present invention is not applicable to the measurement of solids having small surface area; for example, steel shot, and this limitation should be recognized. My method has proved highly satisfactory for making measurements upon cracking catalyst, hydroformer catalyst, CO oxidation catalyst, iron oxide and other miscellaneous materials. It is an advantage of the present apparatus that it can be operated by unskilled personnel.

It is an advantage of the method which I now describe that it is rapid and readily adapts itself to multiple operations; also, calculations are easily made. Thus the time required to test samples having a high surface area (greater than 300 square meters per gram) is greatly reduced.

The distinguishing feature of my invention is the fact that I am able to equilibrate a number of weighted samples simultaneously. The desorption of each sample is measured separately. The surface area is related to the total amount of gas desorbed and may be calculated from the data thus obtained. The procedure for determining pore volume is the same as for surface area except that the samples are equilibrated at a greater presure.

The invention will be described in greater detail in conjunction with the accompanying drawings which illustrate a specific embodiment of the invention and wherein Figure 1 is a schematic drawing of an apparatus adapted to be used in accordance with this invention.

Figure 2:
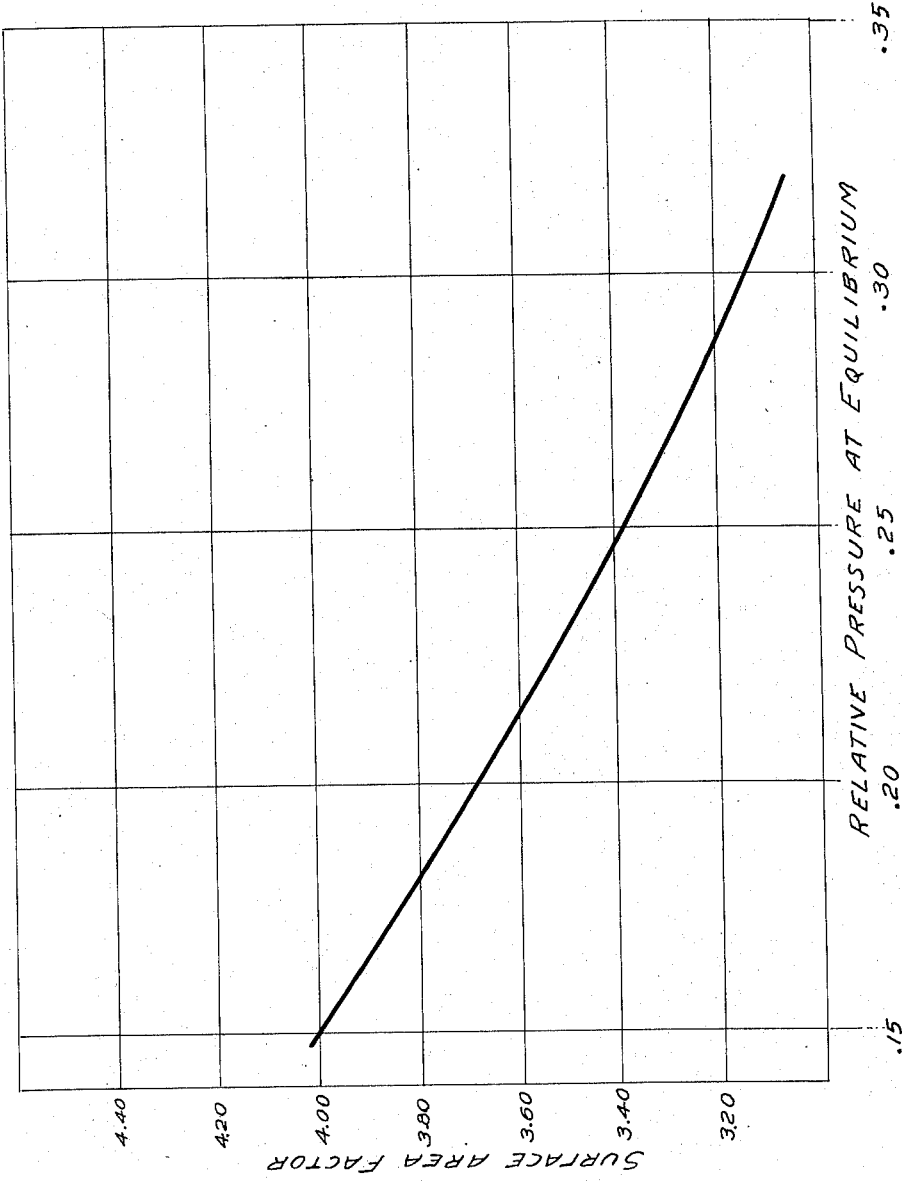

Figure 2 is a graph which indicates the factor $F_s$ to be used in calculating surface area. The factor $F_s$ is based on the value 16.2 square Angstroms as the cross section of nitrogen. The manner in which Figure 2 is used to calculate the surface area will be described below.

In the apparatus illustrated by Figure 1, the source of gas is indicated by the numeral 18. The reduction valve 1 and pressure regulator 2 supply this gas at an absolute pressure in the range of .15 to 1.1 atmospheres (if nitrogen is used as adsorbate and coolant); 3 is a rotameter which indicates when equilibrium is approached; 4 is a wet test meter or gas burette for measuring the amount of gas desorbed and 5 is a vacuum pump which may be used for out-gassing the samples. The adsorption tubes 6, 7, 8 and 9 are for holding the samples tested. The number of such tubes that may be connected to my apparatus is practically unlimited. The valves 10, 11, 12, 13, 14, 15, 16, and 17 enable the operator to isolate certain parts of my apparatus when making a determination. The gage 21 will measure the pressure in the system connected thereto.

A step-by-step description of the manner in which my apparatus, illustrated in Figure 1, is used to carry out my process is as follows:

Surface area determination

The samples of unknown surface area are weighed and charged to the adsorption tubes 6, 7, 8, and 9 which are connected to the apparatus. Valves 10 and 12 are then closed and valves 11, 13, 14, 15, 16, and 17 are opened. The vacuum pump is started and all samples are outgassed for a few minutes. It is advisable to close either valve 11 or 13 and check for tightness and possible leaks, by observing the reading of pressure gage 21 to see if it changes with time. The valves 14, 15, 16, and 17 which connect the adsorption tubes to the system are closed and the adsorption tubes are emersed in liquid nitrogen. The pressure regulator 2 is then set to about 0.20 atmosphere. Valves 12 and 13 are closed and valves 10 and 11 are opened. The valves 14, 15, 16, and 17 are then opened to allow the samples to equilibrate. After approximately one hour, or when the rotameter indicates that adsorption is negligible, valves 14, 15, 16 and 17 are closed. Valve 10 is closed and valves 11 and 12 are opened to connect the wet test meter with the system. The wet test meter is set at 0 or 0 minus a dead space correction and the desorption of each sample is measured separately by opening the valve to the wet test meter (valve 14 in the case of sample tube 6) and replacing the liquid nitrogen bath with a water bath at room temperature. When desorption is complete and the adsorption tube has reached room temperature, the wet test meter reading is recorded and the desorption process is repeated with the other adsorption tubes. The surface area for any sample may be calculated from Formula 1.

Specific surface area =

$$\frac{(\text{wet test meter reading-dead space correction}) F_s Z}{\text{sample weight}} \quad (1)$$

where $F_s$ is a function of the relative pressure at equilibrium. The factor $F_s$ may be determined from Figure 2. The factor Z will correct the wet test meter reading to standard conditions (0° C., 760 mm. Hg, dry gas).

$$Z = \frac{P_1 - P_2}{760} \times \frac{273}{T} \quad (2)$$

when $P_1$ is barometric pressure and $P_2$ is vapor pressure of water at the temperature of the wet test meter. The dead space correction can be readily determined by making a run with the tube filled with zero surface area material having about the same volume as used for samples. This correction is quite small because of compensating factors, and is zero for an equilibrium pressure of about .26 atmosphere.

Due to impurities present in the liquid nitrogen of our cooling bath, the bath temperature is somewhat higher than the boiling point of pure nitrogen. As a result, the saturation pressure $p_0$ (the pressure at which nitrogen gas is in equilibrium with liquid nitrogen at the bath temperature) is above one atmosphere.

When measuring most surface area samples I preferred to equilibrate at a relative pressure of about .26 $p_0$ because at that pressure it can be shown that the dead space correction approaches zero.

Adsorption at high relative pressures (greater than .3 $p_0$) is affected by many contributing factors, among them multi-layer adsorption. It is probable that an equally good measure of surface area can usually be obtained from the amount of adsorption at some arbitrary relative pressure above which monolayer adsorption is substantially complete and capillary condensation or multilayer adsorption small. I assumed for the purposes of my measurements, that the surface area would be proportional to the amount of gas adsorbed in the range .15–.30 $p_0$ and that results so obtained would be accurate. Experimental work indicates this assumption to be correct as my results are in agreement with those obtained by other methods.

*Pore volume determination*

The procedure for determining pore volume is the same as for surface area except that the samples are equilibrated at a different pressure. Some arbitrary decision must be made as to what relative pressure to use. If this pressure is too low, not all the pores will be filled; and if too high, appreciable condensation between particles would be expected. According to the Kelvin equation for nitrogen at —195° C., assuming cylindrical pores and a zero contact angle, the following size pores would be filled at different relative pressures:

| Relative pressure ($p/p_0$) | Pore diameter (A.) |
|---|---|
| .90 | 185 |
| .95 | 374 |
| .97 | 592 |
| .99 | 1,840 |

I favor using a value of $p/p_0 = .97$. Saturation pressure is conveniently measured with the nitrogen vapor pressure thermometer.

The pore volume may be calculated from the expression:

$$\text{Specific pore volume (cc./g.)} = \frac{\text{Desorption (liters)} \times ZQ}{\text{Sample weight (grams)}} \quad (3)$$

where Z is the factor discussed above which corrects wet test meter readings to dry gas at standard conditions. Q is a factor to convert liters of gas at standard temperature and pressure to cc. of liquid nitrogen.

$$Q = \frac{28L}{22.4} \div d$$

where $d$ is the density of nitrogen at the liquid nitrogen bath temperature in grams/cc. and L is the volume of nitrogen in liters.

It will be recognized that other gases such as n-butane, argon, $CO_2$, CO and/or any gases having a vapor pressure of about one atmosphere at 50–225° absolute, may be employed for area and pore volume measurements.

I claim:

1. A method for the measurement of surface areas greater than 0.5 square meter per gram which comprises placing the material to be measured in equilibrium with a gas at a constant pressure below 0.3 of the equilibrium pressure of the said gas with the liquid form of said gas at the temperature at which said material is held, said temperature being between 50–195° absolute; measuring the amount of gas desorbed on heating said material to room temperature and calculating from the amount of gas desorbed the surface area of the material.

2. A method according to claim 1 in which the gas introduced is nitrogen.

3. The method of claim 2 in which the said constant pressure is between .15 and .30 of the said equilibrium pressure.

4. The method of claim 3 in which the said constant pressure is about .26 of the said equilibrium pressure.

References Cited in the file of this patent
UNITED STATES PATENTS

| 2,604,779 | Purcell | July 29, 1952 |
| 2,692,497 | Van Nordstrand | Oct. 26, 1954 |
| 2,729,969 | Innes | Jan. 10, 1956 |

FOREIGN PATENTS

| 339,120 | Germany | July 13, 1921 |

OTHER REFERENCES

Publication, "Determination of the Surface Area of a Solid . . . Isotherm," by James Duncan, Faraday Soc., Trans., vol. 45, 1949, pp. 879–891.